Aug. 6, 1946.  E. A. BRINER  2,405,488
VARIABLE PITCH PROPELLER
Filed April 12, 1944  8 Sheets-Sheet 1

INVENTOR
Emil A. Briner
BY
J. L. Chisholm  ATTORNEY

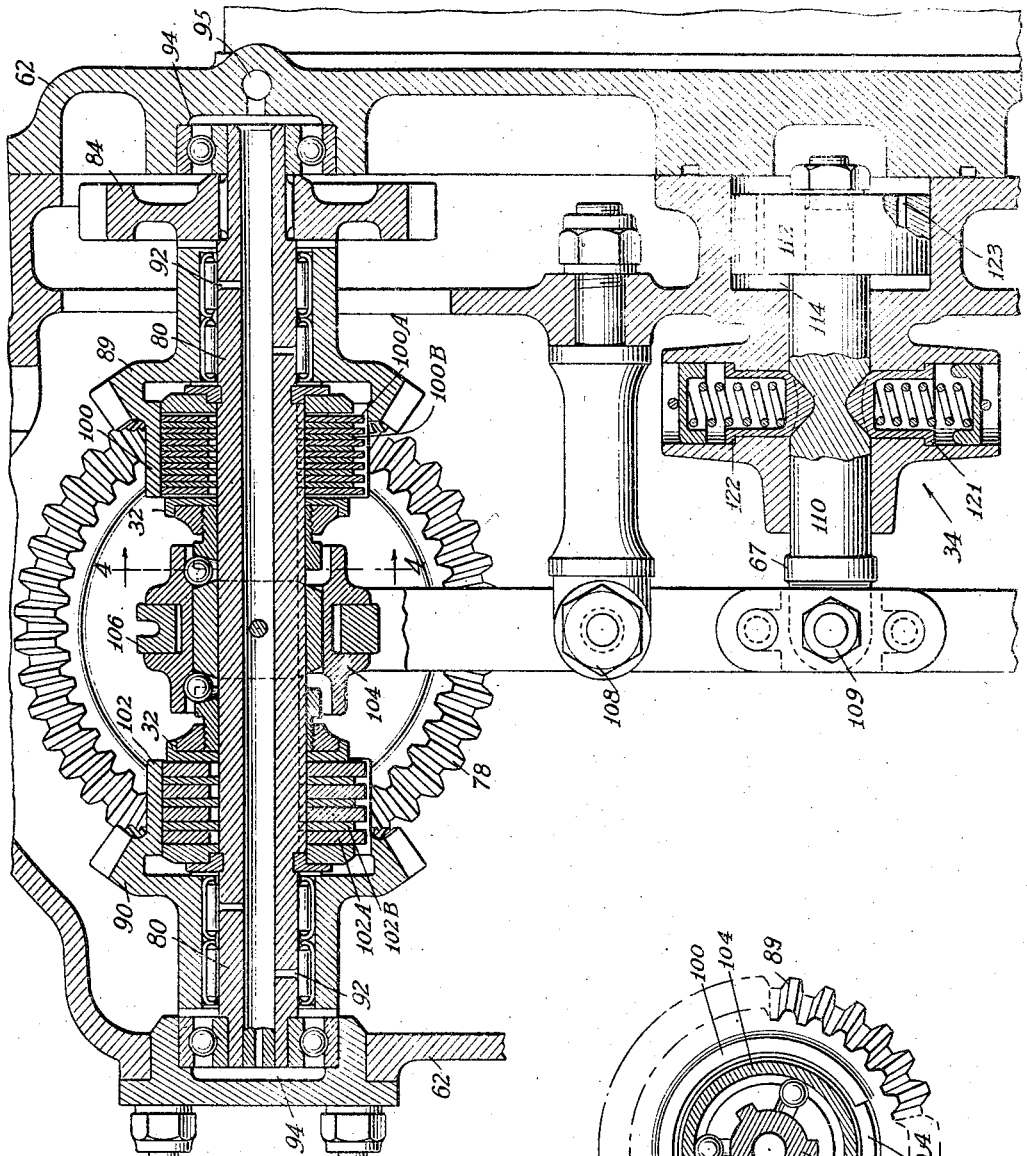
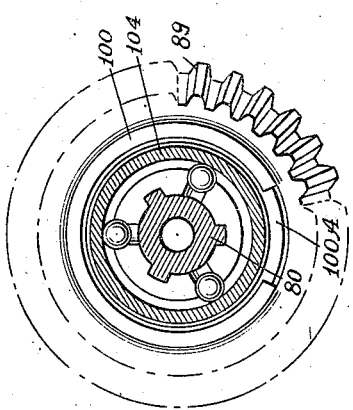

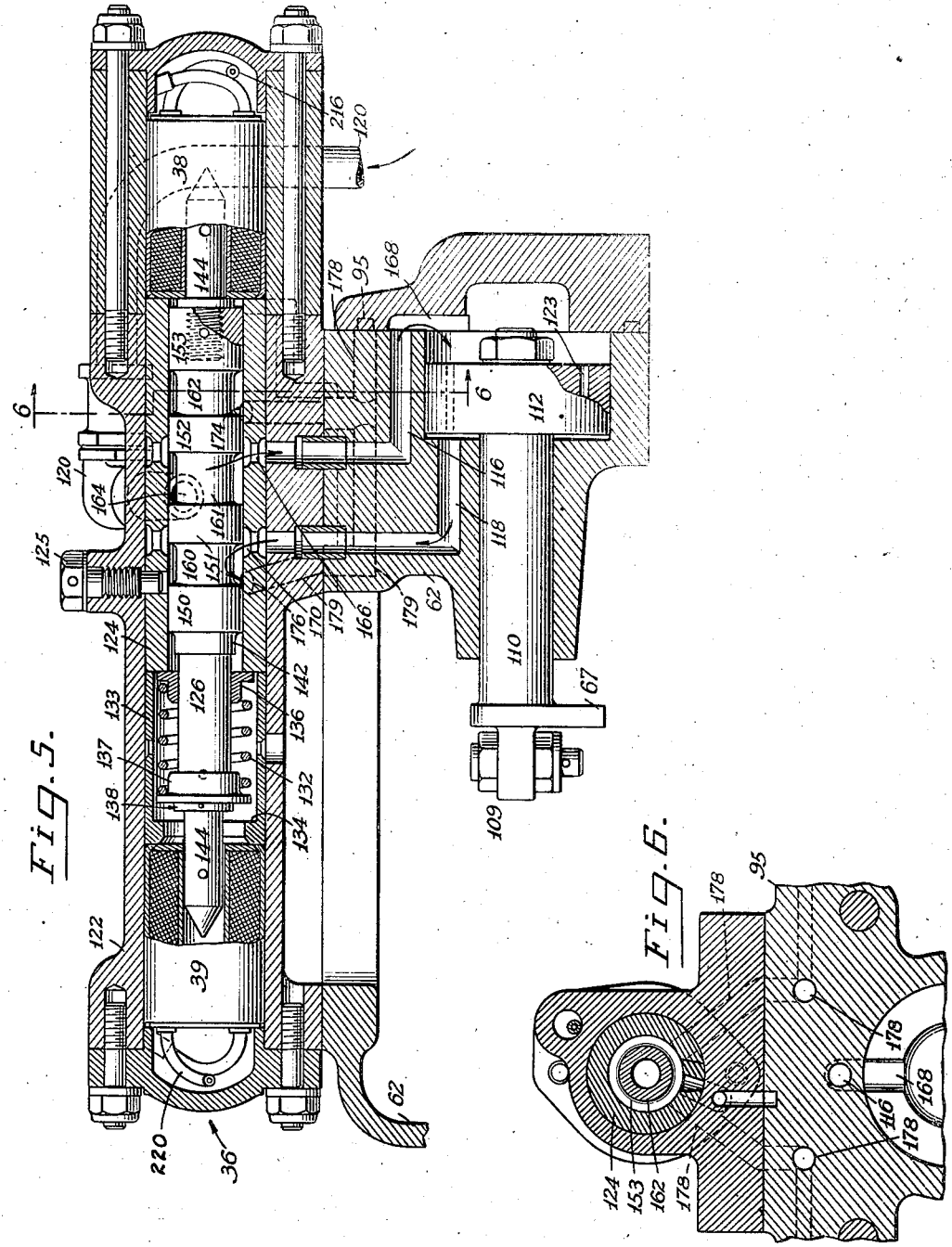

Aug. 6, 1946.  E. A. BRINER  2,405,488
VARIABLE PITCH PROPELLER
Filed April 12, 1944  8 Sheets-Sheet 5

Emil A. Briner INVENTOR
BY
J. L. Chisholm ATTORNEY

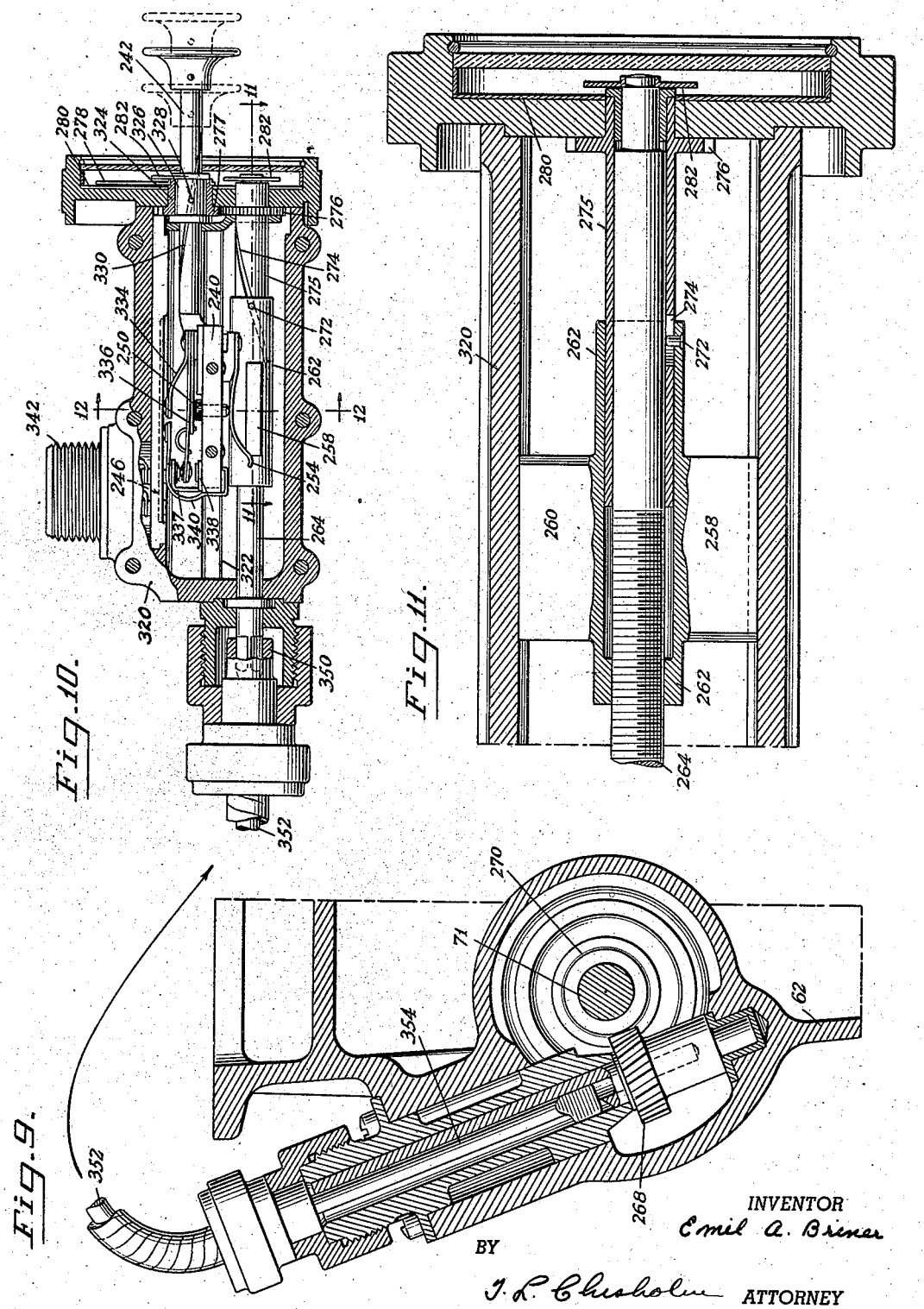

Aug. 6, 1946.   E. A. BRINER   2,405,488
VARIABLE PITCH PROPELLER
Filed April 12, 1944   8 Sheets-Sheet 7
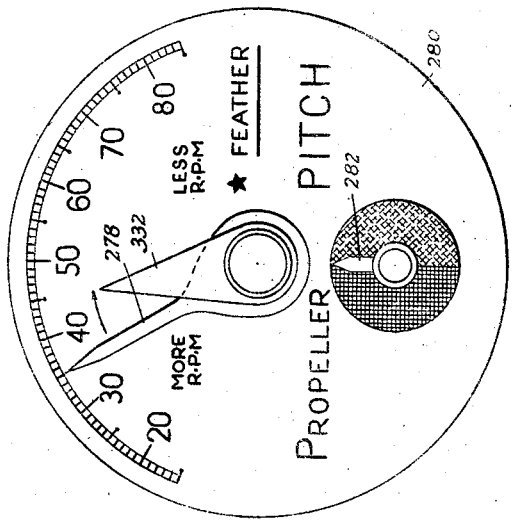
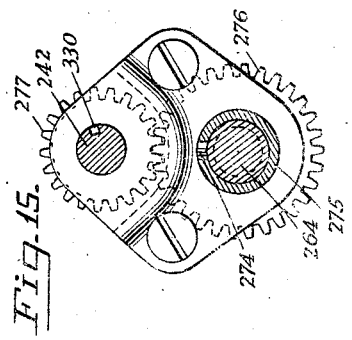
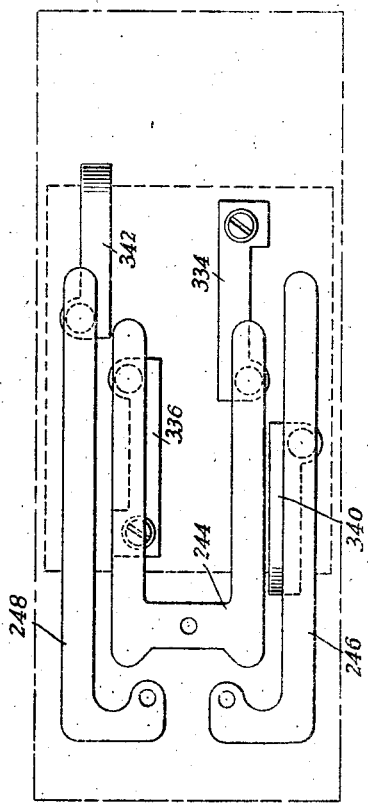
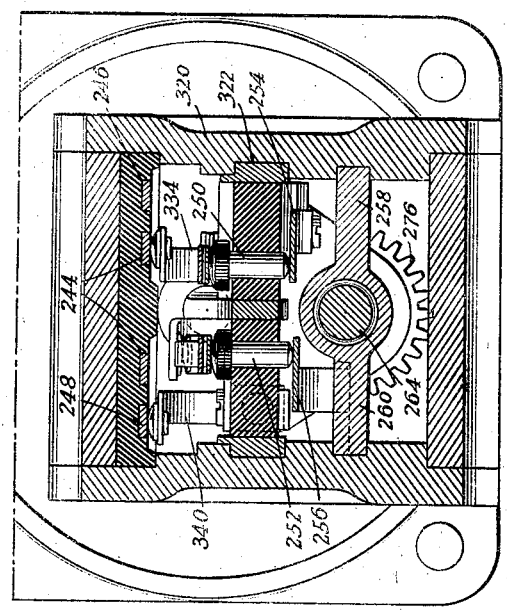
Emil A. Briner INVENTOR
BY
J. L. Chisholm ATTORNEY

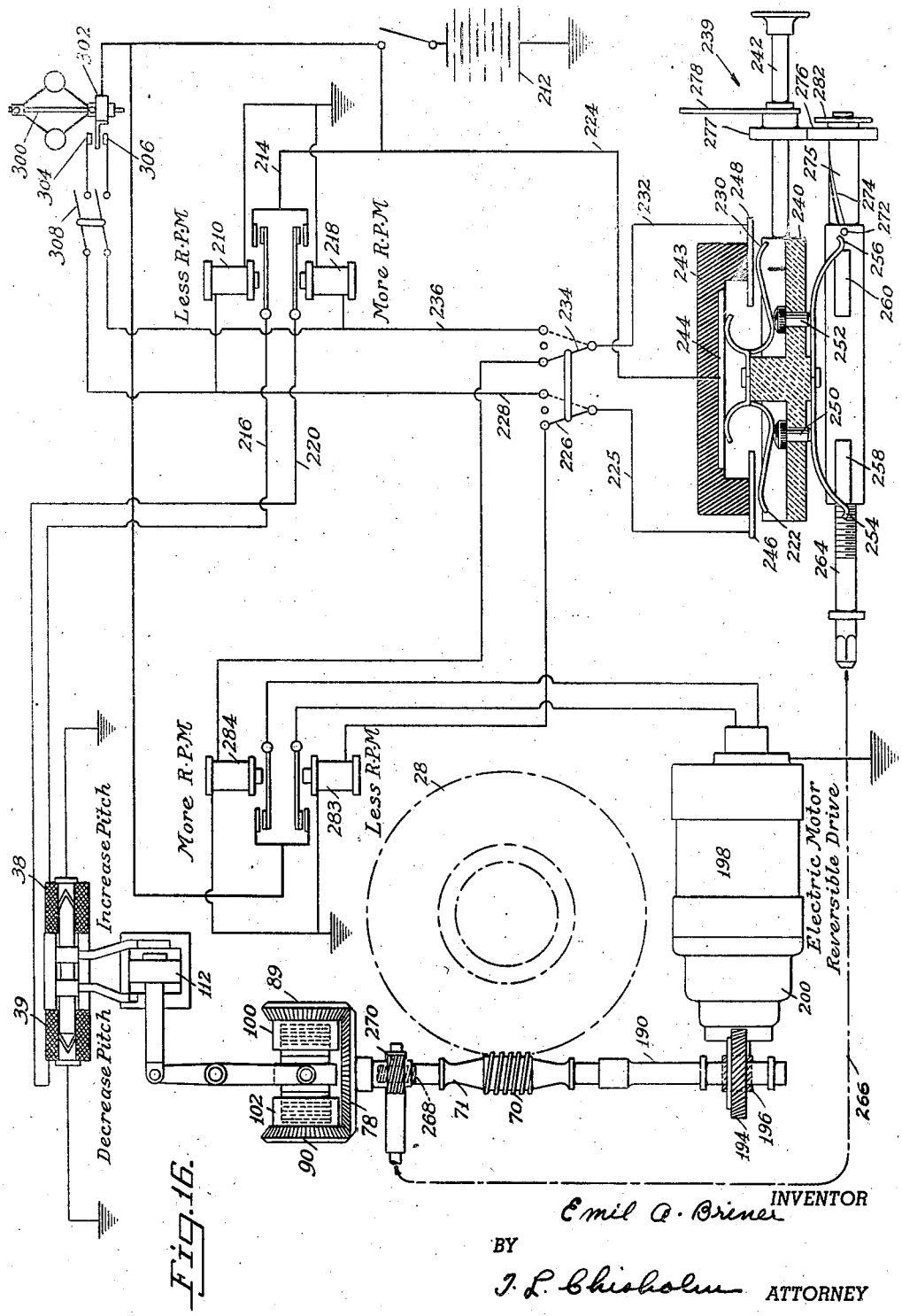

Patented Aug. 6, 1946

2,405,488

UNITED STATES PATENT OFFICE 2,405,488

VARIABLE PITCH PROPELLER

Emil A. Briner, East Orange, N. J., assignor to Aero Engineering Corporation, a corporation of New Jersey Application April 12, 1944, Serial No. 530,594

7 Claims. (Cl. 170—163)

This invention relates to airplane propellers and its purpose is to control the pitch of the propeller blades. Airplanes are customarily equipped with propellers the pitch of which can be varied in flight in order to develop the most effective propelling force under varying flight conditions, for example in air of different densities at varying altitudes and under other varying conditions of flight, such as taking off, cruising and landing.

In my Patent 1,982,284, dated November 27, 1934, I have shown a variable pitch propeller together with means for changing the pitch mechanically (as distinguished from electrically and hydraulically). In this arrangement, the blades are mounted in bearings in a hub and can be turned to any desired pitch by gearing and a cam in the form of a herringbone spline, all of which are mounted in the hub and rotate with it. The spline is shifted axially to turn the gears by rods set in the hub and connected to a ball bearing thrust collar surrounding the propeller shaft and mounted in the engine casing. In my application Serial No. 527,748, filed March 23, 1944, I have shown an improved form of thrust collar for operating pitch control mechanism of the general type shown in the patent referred to.

The present invention resides in an improved system of control and improved mechanism for operating mechanical pitch adjusting devices, especially the forms of such devices shown in my patent and application mentioned before.

Variable pitch propellers for airplanes are of three principal types: electrical, hydraulic and mechanical, each having known advantages and disadvantages. The disadvantages of electric and hydraulic propellers have encouraged the development of various mechanical types, but so far as I am aware, no commercially adequate mechanically adjusted propeller has been devised by others, especially none which are adapted to very large propellers, for example, 2,000 horsepower. The force required to adjust the pitch of such large propellers in flight is frequently great, and it has been a problem to provide a mechanical pitch adjuster which is sufficiently light in weight to be justifiably carried in a plane, which is sufficiently compact to be installed in the available space and which has sufficient power to change the propeller pitch rapidly enough to satisfy the rapidly changing requirements of flight, especially maneuvering in combat.

My invention seeks to provide a mechanical pitch adjuster, especially one adapted to large size propellers, which is compact, light in weight, and fast and reliable in operation. It also seeks to provide improved means for constantly indicating the pitch of the propeller and instantly indicating minute changes of pitch. Another object is to provide a control system normally operated by the engine itself, but operable to feather the propeller when the engine is not operating, so as to reduce air resistance of the plane and prevent damage to the engine.

In the accompanying drawings:

Fig. 3 is a horizontal longitudinal section on the line 3—3 of Fig. 1, showing the hydraulic motor and clutch mechanism.

Fig. 4 is a vertical cross section of a clutch collar on the line 4—4 of Fig. 3.

Fig. 5 is an enlarged vertical longitudinal section corresponding to Fig. 1 showing the hydraulic motor and its associated control mechanism.

Fig. 6 is a vertical cross section on the line 6—6 of Fig. 5.

Fig. 9 is a horizontal longitudinal section on the line 9—9 of Fig. 2, showing an indicator drive mechanism.

Fig. 10 is a vertical longitudinal sectional view of a control switch, the interior parts being shown in elevation, and certain parts being omitted for clarity of illustration.

Fig. 11 is an enlarged horizontal longitudinal section on the line 11—11 of Fig. 10.

Fig. 12 is an enlarged vertical cross section on the line 12—12 of Fig. 10.

Fig. 13 is an enlarged plan of contacts in the top of the switch.

Fig. 14 is an elevation of an indicating mechanism as seen from the right of Fig. 11.

Fig. 15 is an enlarged elevation of the gear drive of the indicator, and Fig. 16 is a diagram of a control circuit.

Figure 1:
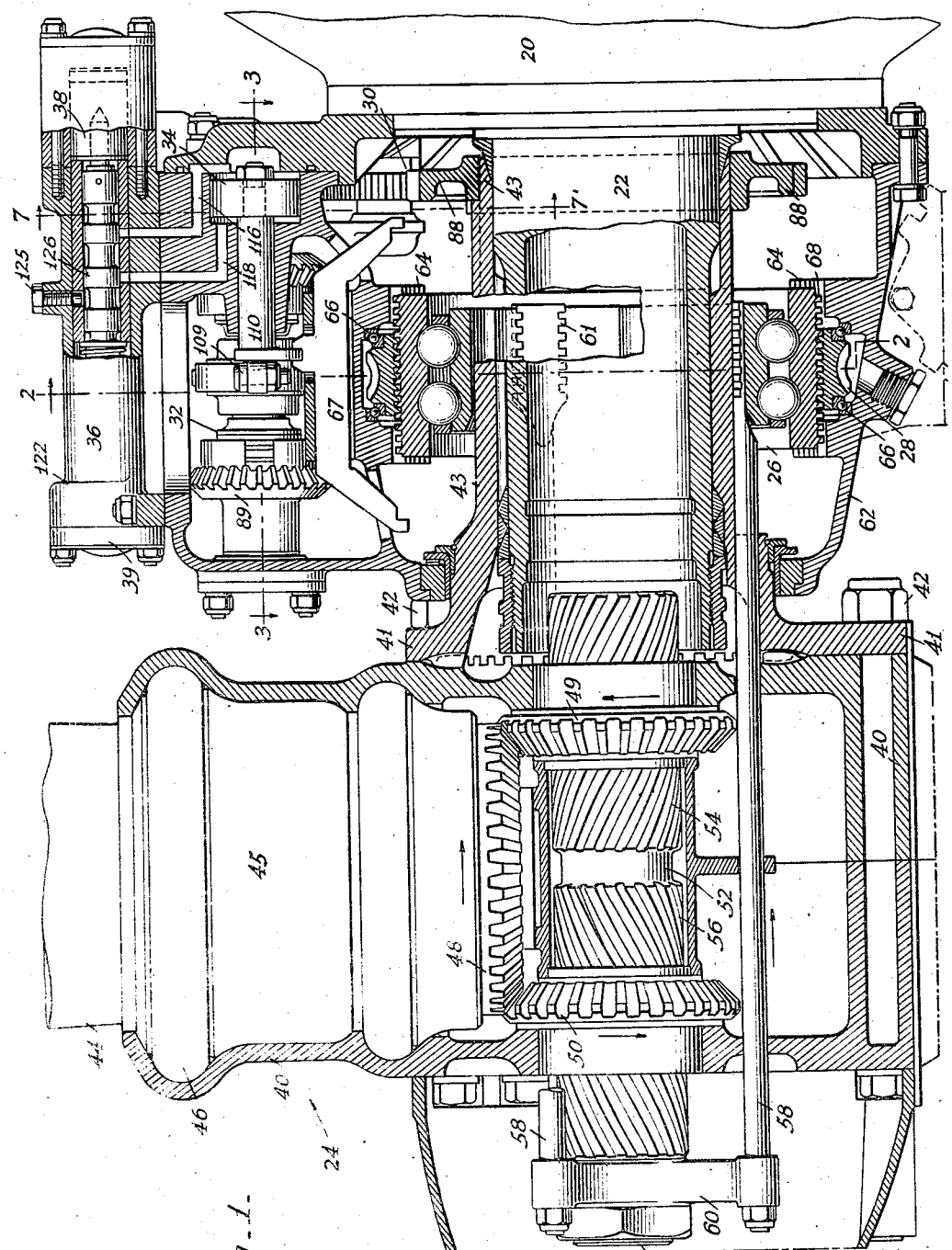
Fig. 1 is a longitudinal section through a variable pitch propeller hub and pitch changing mechanism constructed in accordance with my invention, certain interior parts being shown in elevation for clarity.

As shown in Fig. 1, a prime mover or engine 20 has a shaft 22 for supporting and driving a propeller 24. The pitch of the propeller blades is adjusted and locked by a ball bearing thrust collar 26 mounted in the engine housing and shifted along the propeller shaft by a worm-driven nut 28 operated by a duplex mechanical motor 30 driven by the engine 20. The mechanical motor 30 is connected to the worm drive and disconnected from it by a group of clutches 32 which are engaged and disengaged by a small hydraulic motor 34 operated by lubricant under pressure from the engine and controlled by a pilot valve 36. The pilot valve is operated by an electric motor in the form of two solenoids 38 and 39 which are energized in response to the speed of the engine 20, or by hand.

The pitch adjusting mechanism

The particular form of pitch adjusting mechanism is preferably as shown and described in my application referred to. The propeller proper 24 includes a hub 40 bolted to a flange 41 by bolts 42. The flange is an integral part of a sleeve 43 keyed to the propeller shaft 22 so as to rotate with the shaft. The hub has any desired number of hollow arms for supporting propeller blades 44 having roots 45 mounted in anti-friction bearings 46 so as to be rotatable to adjust the pitch. Each blade root has secured to it a bevel gear 48 which meshes with two bevel gears 49 and 50 journaled in the hub and actuated in opposite directions by a herringbone spline member 52 having oppositely inclined splines 54 and 56 sliding in corresponding inclined grooves in bores within the bevel gears, so that when the spline member is moved axially, the two gears 49 and 50 rotate oppositely to turn the blades 44 to any desired pitch.

The spline member 52 can be shifted axially in either direction by three rods 58 supported in the hub and connected at their outboard ends to the spline member through a crosshead 60 and connected at their inboard ends as at 61 to the thrust collar 26. The thrust collar is mounted in a housing or casing 62 which forms part of the casing of the engine 20, and is splined so as to be axially slidable but not rotatable in a grooved seat 64 within the casing, so that it can be moved axially by means of the worm wheel 28, which is mounted in ball bearings 66. The normal extent of axial movement of the thrust collar 26 is limited by a pitch limit throw-out 67 which disconnects the hydraulic motor 34 from the worm drive whenever the collar reaches predetermined axial positions, that is, when the propeller has attained a predetermined maximum or minimum pitch.

When the propeller is rotated, centrifugal force tends to turn the blades to the flat position of approximately zero pitch, as is well known. In the case of large propellers at high speed, this develops a heavy torque in the blade roots which is transmitted to the pitch-changing means as axial thrust. In order to prevent this axial thrust from changing the pitch setting of the blades, the threads 68 on the thrust collar 26 and worm wheel 28 are made to a very low spiral angle, preferably not more than 2°, which prevents the pull of the rods 58 on the thrust collar from rotating the worm wheel even under the influence of engine vibration. Thus the threaded worm wheel serves as a pitch lock and the pitch can be adjusted only by turning the worm wheel to move the collar axially in the interior threads of the worm wheel.

The mechanical motor and pitch-shift drive

Figure 2:
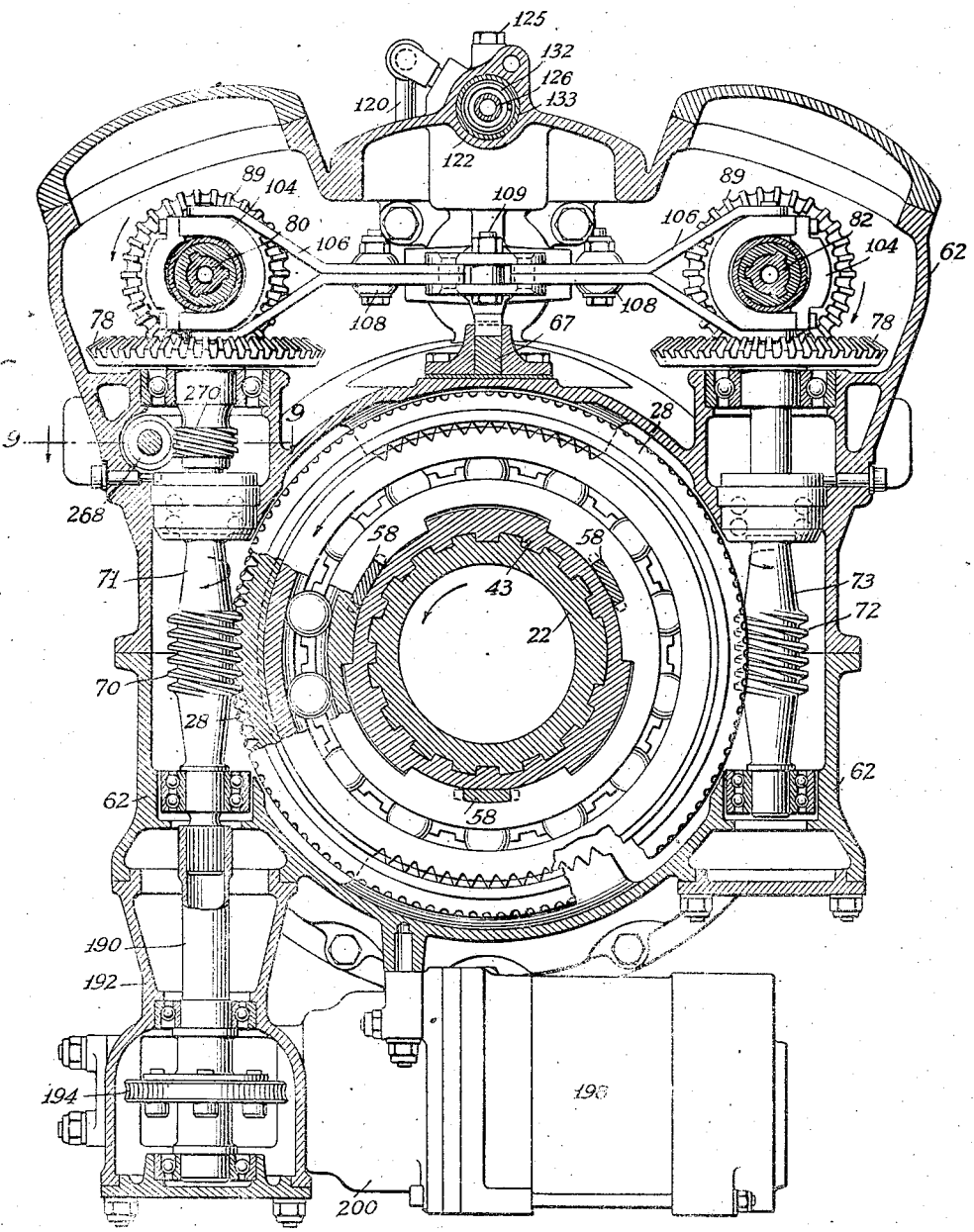
Fig. 2 is a vertical cross section on the line 2—2 of Fig. 1.

As shown in Fig. 2, the worm wheel 28 is rotated to adjust the propeller pitch by two opposite worms 70 and 72, formed on shafts 71 and 73 which are suitably journaled in the casing 62. The worms are of steep pitch, that is not self-locking. The worm shafts can be rotated in either direction by bevel gears 78 which can be driven in either direction by the motor 30 referred to.

Figure 7:
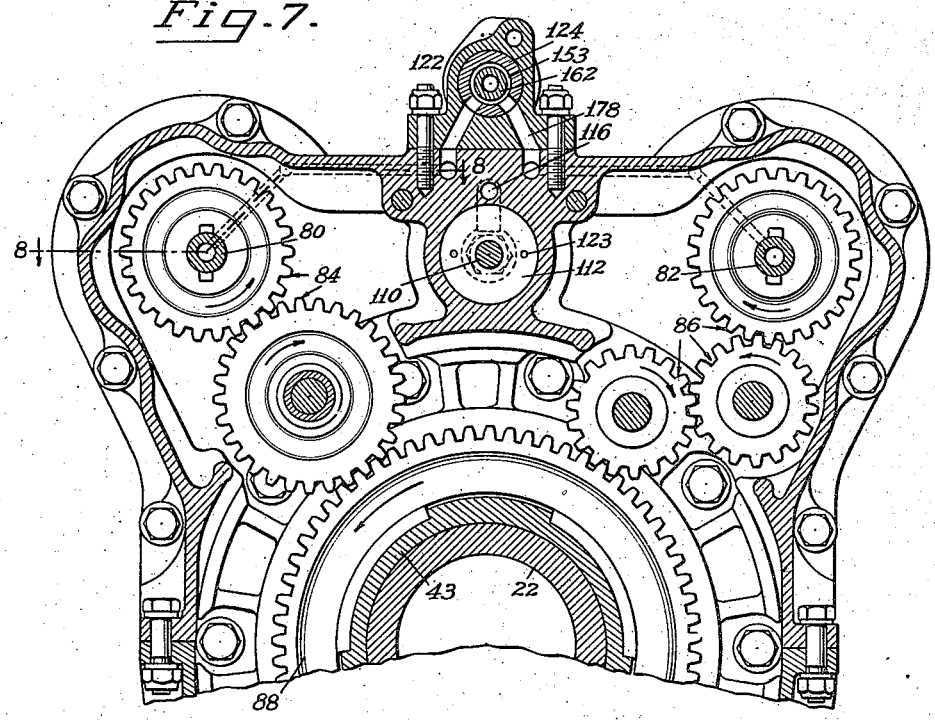
Fig. 7 is a partial vertical cross section on the line 7—7 of Fig. 1.

As shown in Fig. 7, the mechanical motor 30 includes a pair of shafts 80 and 82 constantly driven in opposite directions by two gear trains 84 and 86 driven by the master gear 88 keyed to the motor shaft sleeve 43. The shafts 80 and 82 are similar, hence only one will be described in detail. As seen in Fig. 3, the shaft 80 is journaled in suitable bearings in the casing 62 and carries two freely rotatable bevel gears 89 and 90 which constantly mesh with the worm shaft bevel gear 78 previously described. The shaft is hollow and has passages 92 and clearance as at 94 to convey lubricant from the engine through a passage 95 to anti-friction bearings in the bevel gears 89 and 90, and to the shaft bearings. The bevel gears 89 and 90 are formed with integral clutch housings 100 and 102 respectively, belonging to the group of clutches 32 and in which are keyed the driven plates 100—A and 102—A of the clutches, the driving plates 100—B and 102—B being keyed to the shaft 80. The clutches may be of any desired construction and their form is immaterial to the present invention. When the clutches 100 are engaged, the two bevel gears 89 are driven by the shafts 80 to rotate the bevel gears 78 and consequently the worms 70 and 72 to drive the worm wheel 28 in one direction, whereas when the clutches 102 are engaged, the worms 70 and 72 are driven to rotate the worm wheel 28 in the opposite direction through the bevel gears 90. Worms 70 and 72 must be driven in opposite directions simultaneously.

Each clutch is caused to engage by the pressure of a clutch collar 104 operated by a yoke 106, as shown in Figs. 2 and 3, the yoke being pivotally supported at 108 and connected at 109 to a piston rod 110 forming part of the hydraulic motor 34. When the yoke is urged to the right of Fig. 3, clutches 100 are engaged and clutches 102 are disengaged. The clutches 100 increase the pitch of the propeller and to do so are required to transmit a heavier load to the pitch shift than the clutches 102 transmit to decrease the pitch, due to the inherent centrifugal tendency of the propeller to reduce its pitch. Consequently the clutches 100 are provided with a greater number of plates than the clutches 102.

One of the problems in constructing a pitch shifting apparatus of this character is to provide means for shifting the pitch quickly, which means is sufficiently compact to be installed in the available space, and sufficiently light in weight to justify being carried in the plane. A single clutch 100 which can be contained in the available space in the housing 62 will not continuously transmit sufficient power to change the pitch as rapidly as is required in modern combat flying, which may require pitch changes as fast as 30° per second. Consequently, the second worm 72 with its associated clutches and drive mechanism is provided, and there are two clutches 100 which transmit the power to increase the pitch, and two clutches 102 which transmit the power to decrease the pitch. Preferably, both of the clutches engage simultaneously but it may be difficult to assure that this will always occur. In practice, one clutch may engage an instant before the other and in such instances one clutch will drive the worm wheel 28 alone until the other clutch picks up its load. For this reason, the worms 70 and 72 and worm wheel 28 must be of reversible pitch so that in the instant when one clutch is not carrying its load, its associated worm will not lock the worm wheel but will be driven by the worm wheel from the other clutch.

The hydraulic motor

As shown in Figs. 3 and 5, the hydraulic motor 34 consists of a piston 112 mounted on the piston rod 110 and sliding in a cylinder 114 to which oil is supplied through passages 116 and 118 which are fed by the oil supply conduit 120 under the control of the pilot valve 36. For the purposes of this application, the conduit 120 constitutes means for supplying oil under pressure from the engine 20 to the hydraulic motor. When the piston is at the left end of the cylinder as seen in Figs. 3 and 5, the clutches 100 are engaged to increase the pitch of the propeller, and when the piston is at the right end of the cylinder the clutches 102 are engaged to decrease the pitch. The piston is constantly urged to the central position shown in Fig. 3 (in which all clutches are disengaged) and is normally held in this position by a pair of spring pressed plungers 121 fitting in conical depressions in the piston rod. The points of the plungers always remain in the depressions, even when the piston is at the end of the cylinder. In order to permit the piston to return to its central position under pressure of the spring plungers, leak passages 123 extend through the piston so that oil can pass from one side of the piston to the other.

The cylinder is short and the movement of the piston is small. When oil is supplied to either side, it flows to the cylinder faster than it can leak through the holes 123, so that the piston quickly takes its position to operate one set of clutches in spite of the leak. However, when the control shuts off the flow of oil to the cylinder, the spring plungers quickly return the piston to its neutral position and disengage the clutches.

As shown in Figs. 1 and 5, the piston rod 110 carries the pitch limit yoke 67 having two arms disposed in the path of the thrust collar 26. When the piston 112 and yoke 67 are moved to the right, the clutches 2 are engaged and the worm wheel 28 is driven in the direction to move the thrust collar to the left to decrease the pitch. When the collar has moved far enough to strike the left-hand arm of the pitch limit yoke 67, further movement of the thrust collar to the left carries the yoke 67 with it and moves the piston back to neutral position against the pressure of the oil supply, disengaging the clutches. The position at which this disengagement occurs is selected to give the minimum desired propeller pitch or the maximum reverse pitch, if the propeller is intended to be used as an air brake. Conversely, movement of the thrust collar to the right, as seen in Fig. 1, increases the pitch of the propeller until the right-hand arm of the pitch limit yoke 67 is moved to return the piston to neutral position and disengage the clutches.

The pilot valve

As shown in Figs. 1 and 5, a valve housing 122 is attached to the main housing 62 and is provided with a central bore containing a non-magnetic liner 124, positioned by a dowel 125, a non-magnetic piston valve 126, and the pair of solenoids 38 and 39 for moving the valve to either of two operative positions against the force of a return spring 132 which always returns the piston valve 126 to an intermediate neutral position. The spring is confined in a spring housing or bushing 133 having a shoulder 134 at one end, and being open at the other end. The liner 124 forms a shoulder for this other end. The spring is compressed between two collars, one the collar 136, which is slidable on the stem of the piston valve 126 and which normally rests against the liner 124, and the other a collar 137 which is slidable on the valve stem as far as an abutment formed by a fixed collar 138. The collar 136 slidably fits the shaft of the piston valve, and a shoulder 142 is formed on the shaft adjacent the collar 136. The collar 138, fixed on the shaft, can pass through the opening in the shoulder 134, but the sliding collar 137 cannot. When the shaft is free, it is moved to its neutral or central position from any other position by the spring 132 which holds the collar 136 against the liner 124 and pushes the valve stem to the left until the collar 137 rests against the shoulder 134. Further movement to the left is prevented by the shoulder 142 which then rests against the collar 136.

A magnetic core 144 is attached to each end of the piston valve and is disposed within one of the solenoids 38 or 39. When solenoid 38 is energized, the valve is moved to the right against the compression of spring 132 to the position shown in Fig. 5. If the solenoid 39 is energized, the valve moves to the extreme left, compressing the spring between the collars 138 and 136 (forced to the left by shoulder 142).

Figure 8:
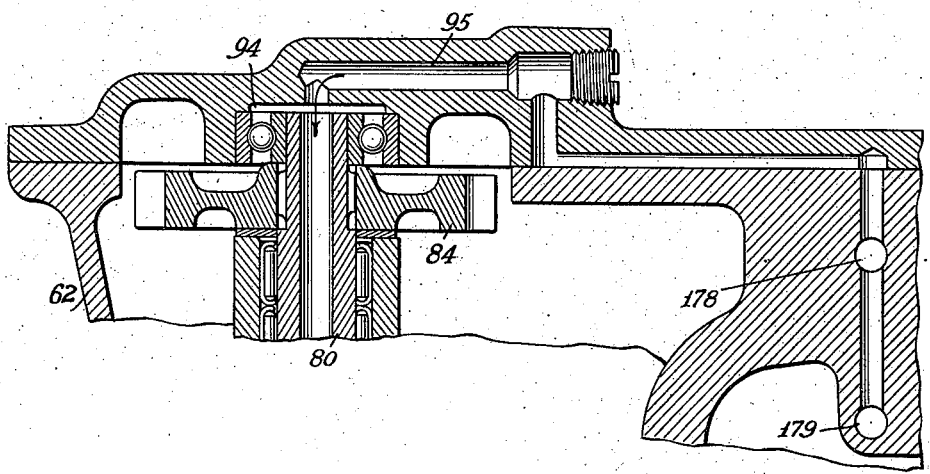
Fig. 8 is an enlarged section on the line 8—8 of Fig. 7.

The piston valve is provided with four lands 150, 151, 152 and 153—separated by three grooves—160, 161 and 162. The liner is provided with an intake opening 164 registering with the oil pressure supply conduit 120, and is provided with an opening 166, leading to a passage 116, which supplies oil to the right-hand side of the piston as seen in Fig. 5; an opening 170 leading to passage 118 communicating with the left-hand side of the piston and openings 174 and 176 communicating with oil drain passages 178 and 179 in the casing 62 which lead back ultimately to the oil sump of the engine, from which the lubricating oil is normally drawn. Conduits 178 and 179 also supply oil to the passage 95 (Fig. 8) which lubricates the clutch shift mechanism.

When the piston valve is in the position shown in Fig. 5, oil under pressure is supplied to the right end of the cylinder 114 from conduit 120, opening 164, groove 161 and passage 116. Also the groove 160 establishes communication between the opening 170 and the drain opening 176, permitting oil to flow from the left side of the piston to the drain. The pressure of the oil forces the piston to its extreme left-hand position shown in Fig. 5 and when the piston is in this position, the yokes 106 engage the clutches 100 (Fig. 3) to drive the worms 70 and 72 so as to rotate the worm wheel 28 to increase the propeller pitch.

When the solenoid 39 is energized, the piston valve will be moved to the extreme left-hand position in which the groove 161 will establish communication between the oil supply conduit 120 and the opening 170 and the groove 162 will establish communication between the opening 166 and the drain opening 174. This will permit oil under pressure to reach the left side of the piston and will drain the right side of the piston forcing the piston to its extreme right-hand position and causing the yokes 106 to engage the clutches 102.

When neither solenoid is energized, the lands 151 and 152 will block oil inlet openings 166 and 170 so that no oil under pressure can reach the piston. This permits the spring plungers 122 to return the piston to the neutral position shown in Fig. 3.

The feathering mechanism

The mechanical motor is ordinarily used to shift the pitch within normal operating ranges, for example between a maximum positive pitch of 35° and a minimum positive pitch of 15°, or in cases when it is desired to use the propeller as a brake, a maximum negative pitch of 15°. The pitch-shifting mechanism so far described cannot be operated when the engine is not running. In order to feather the propeller or to shift the pitch when the engine is not running, the worm shaft 71 may be driven by an external source of power exemplified in Fig. 2. A drive shaft 190 is keyed to the end of the shaft 71 and mounted in suitable bearings in an extension 192 of the housing 62. The shaft 190 is driven by a worm wheel 194 and worm 196 (Fig. 16) of reversible pitch, driven by an electric motor 198 through a centrifugal clutch 200. The motor 198 is normally inoperative, being disconnected by the clutch, and the worm wheel may rotate by driving its reversible worm whenever the main control mechanism operates the shaft 71. However, when the main control mechanism is not operating, the motor may be operated by any suitable control, the centrifugal clutch automatically connecting the motor to rotate the shaft 190.

Pitch control and indicator

The invention includes a novel system and structure for predetermining any desired pitch of the blades, indicating this predetermined pitch, starting the pitch-shifting mechanism, indicating at all times the actual pitch of the blades, and automatically stopping the pitch-shifting mechanism when the predetermined pitch is attained. This is diagrammatically represented in Fig. 16.

The pitch-increasing solenoid 38 can be energized by a relay 210 which closes a circuit from a battery 212 through control wires 214 and 216 and solenoid winding 38 to ground. The pitch-decreasing solenoid can be energized by a similar relay 218 which connects winding 39 by control wire 220 to the battery through wire 214. The pitch-increasing relay 210 is energized by a spring switch contact 222, which when closed, connects the battery through central control wire 224, relay control wire 225, switch blade 226 (when in dotted line position) control wire 228 and winding of relay 210 to ground. Similarly the pitch-decreasing relay may be energized by a spring contact 230 which when closed connects the battery through central control wire 224, relay control wire 232, switch contact 234 (in dotted line position), wire 236, and winding of relay 218 to ground. The switch blades 222 and 230 constitute a switch assembly 239 which is mounted on an insulating slide 240 which can be moved back and forth by a handle 242. A stationary insulating cover 243 carries a contact 244 with which switch blades 222 and 230 always remain in contact as the slide 240 is moved. This contact 244 is connected to the main control wire 224. The insulating cover 243 also has stationary contacts 246 and 248, connected with relay control wires 225 and 232 respectively, and cooperating with spring blades 222 and 230 respectively. The blades are normally out of contact with the stationary contacts 246 and 248, but may be sprung against the stationary contacts by insulating plungers 250 and 252, which can be raised by spring blades 254 and 256. The springs 254 and 256 may be raised to lift the plungers and close the switches by cams 258 and 260 respectively, but when not so raised, let the plungers 250 and 252 drop, opening the switches.

When it is desired to increase the pitch, the handle 242 is pulled out, moving the switch slide 240 to the right. The spring 254 rides up on cam 258 and closes the circuit to relay 210. This energizes solenoid 38 which in turn permits the pitch to increase either until the maximum pitch is reached, when the apparatus is stopped by the mechanical throw-out 67, or until a pitch is reached which is determined by the amount the handle is pulled out. When this latter occurs, the circuit to the relay 210 is interrupted by the follow-up device incorporated in the switch mechanism. The follow-up includes the cams 258 and 260, mounted on a sleeve 262 threaded on a shaft 264 and supported so that the sleeve can slide but cannot rotate as the shaft is turned. The shaft 264 is driven synchronously with the pitch-shifting worm shaft 71 by any suitable repeater connection 266 with a worm wheel 268 driven by a worm 270 on the shaft 71. This connection 266 may be a flexible shaft 352 as shown in Fig. 9 or any equivalent means.

As the pitch increases, the shaft 264 rotates and the number of revolutions is a measure of the change of pitch. Consequently the travel of the threaded sleeve 262 is a measure of the pitch change. When this travel equals the amount the handle 242 has been pulled out, the spring 254 drops off the cam 258 and the switch 222 opens, stopping the pitch change apparatus.

In order to indicate the actual pitch, the sleeve carries a pin 272 projecting into a spiral cam slot 274 in a sleeve 275 surrounding the shaft 264 and inside the sleeve 262. The sleeve 275 carries a gear 276 meshing with a gear 277 which actuates a pointer 278, the position of which indicates the pitch of the propeller on any suitable scale such as the dial 280 shown in Figs. 10, 11 and 14. A pointer 282 mounted directly on the shaft 264 shows the revolutions made by the shaft, and hence is a measure of minute changes of pitch. It serves as an indicator of the direction in which the pitch is changing and because it moves faster than the pointer 278 helps to prevent inadvertent changes in the wrong direction.

The previously described switch blades 226 and 234 constitute a selector switch by which the control by solenoids 38 and 39 can be cut out and the propeller pitch changed by the feathering motor 198. When this switch is in the solid line position of Fig. 16, the main switch 239 controls a pitch increasing relay 283 and a pitch decreasing relay 284 which operate the motor 198 in opposite directions in the same way the relays operate the solenoids 38 and 39. When the motor 198 is operating, the mechanical pitch-shifting motor 30 is disengaged. Consequently the mechanical pitch limit 67 does not operate and the propeller can be shifted to any pitch predetermined by the position of the handle 242. The motor 198 will be used principally to feather or unfeather the propeller or to change the pitch for demonstration or adjustment on the ground.

A governor is provided for controlling the pitch of the propeller during flight to maintain a constant engine speed. Any suitable construction of governor may be used. It is schematically represented in Fig. 16 as including a shaft 300 driven synchronously with the engine and having a collar 302 which is raised as the speed increases. The collar is connected to the high side of the battery. The collar carries a switch blade which, upon being raised, makes contact at 304 to energize the relay 210 to increase the pitch and thus reduce engine speed, and upon being lowered makes contact at 306 to energize relay 218 to reduce the pitch and increase engine speed. The governor is cut in or out by a governor switch 308. When the governor is used, the hand control 239 is cut out by the selector switch blades 226 and 234, which are placed in a neutral position.

Figs. 9 to 14 inclusive show one form of structural arrangement of the pitch indicator and switch diagrammatically shown in Fig. 16. A housing 320 contains the switch slide 240 mounted in guides 322, and the counter or indicator shaft 264, in suitable bearings. The cams 258 and 260 project from opposite sides of the sleeve 262 and slide in guides in the casing 320 as shown in Fig. 12. The gear 277 is formed on a sleeve 324 (shown in section in Fig. 10), which surrounds the handle rod 242 and projects through the dial 280 to carry the pitch indicating needle 278. The sleeve 324 forms a bearing for an inner sleeve 326 (shown in elevation in Fig. 10) which forms a slide bearing for the rod 242. The sleeve 326 has a pin 328 projecting into a spiral cam slot in the rod 242 so that the sleeve turns, when the rod is slid in or out, an amount proportional to the travel of the rod, and hence a measure of the pitch which the setting of the handle thus determines. The sleeve 326 carries a pointer 332 in front of the dial 280 which indicates the pitch setting of the switch.

The switch 239 proper consists of duplicate independent switches, one for increasing pitch, the other for decreasing pitch. The actual pitch-increasing switch is shown in elevation in Fig. 10 and the pitch-decreasing switch which is placed behind it (but turned end for end) has been omitted for clarity of illustration. The pitch-increasing switch includes a spring blade 334 which is constantly in contact with the plate 244. The blade 334 is also connected to a snap acting blade 336 shown in the open position against a stop 337 in Fig. 10. The two blades 334 and 336 correspond to the single blade 222 shown diagrammatically in Fig. 16. When the pin 250 is raised, the blade 336 snaps down against a contact 338 connected with a spring blade 340 which is constantly in contact with the plate 246 in Fig. 13. The control wires 224, 225 and 232 are brought in through a conduit connection 342 and connected to the plates 244, 246 and 248.

A similar switch for decreasing the pitch is operated by the plunger 252 (Fig. 12) raised by the spring 256 and cam 260 when the switch handle 242 is pushed in.

The threaded shaft 264 has a driving connection 350 with one end of a flexible shaft 352, the other end of which is splined in a hollow shaft 354 (Fig. 9) driven by the worm wheel 268.

Thus when the pitch control handle 242 is moved, the amount of its movement predetermines the setting of the propeller and indicates this setting by the pointer 332. The handle also sets the cam 258 or 260 in a position which will both close the appropriate switch contacts to establish the circuit between plates 244 and 246 or between 244 and 248 (to energize either the appropriate pilot valve solenoid 38 or 39, or drive the feathering motor 198 in the proper direction) and to interrupt this circuit to stop the pitch-shifting apparatus when the predetermined pitch is attained.

I claim:

1. The combination of a rotatable variable pitch propeller, a member for changing the pitch of the propeller blades while the propeller is being rotated, a non-reversible force-transmitting actuator for said member, a worm wheel for moving the actuator, a pair of worms for driving the worm wheel, two independent power transmitting means for driving the worms to change the pitch of the blade and means for engaging and disengaging the power transmitting means, the worms and worm wheel being of reversible pitch to permit one worm to drive the other worm through the worm wheel when there is a time lag between the starting of the two worms by the two power transmitting means.

2. The combination of a variable pitch propeller, a prime mover for rotating the propeller, a member for changing the pitch of the propeller blades while the propeller is being rotated by the prime mover, a non-reversible force-transmitting actuator for said member, a worm wheel for moving the actuator, a pair of worms for driving the worm wheel, two independent power transmitting means, both connected to said prime mover and one connected to each of said worms for driving the worms to change the pitch of the blades, and means for engaging and disengaging the power transmitting means, the worms and worm wheel being of reversible pitch to permit one worm to drive the other worm wheel when there is a time lag between the starting of the two worms by the two power transmitting means.

3. The combination of a variable pitch-propeller, a prime mover for rotating the propeller, a member for changing the pitch of the propeller blades while the propeller is being rotated by the prime mover, a non-reversible force-transmitting actuator for said member, a worm wheel for moving the actuator, a pair of worms for driving the worm wheel, two independent clutches connected one to each worm and both to the prime mover, and a single means for operating both clutches, the worms and worm wheel being of reversible pitch to permit one worm to drive the other worm through the worm wheel when there is a time lag between the starting of the two worms by the two clutches when operated by said single means.

4. The combination of a variable pitch propeller, a prime mover for rotating the propeller, a member for changing the pitch of the propeller blades while the propeller is being rotated by the prime mover, a non-reversible force-transmitting actuator for said member, a worm wheel for moving the actuator, a pair of worms for driving the worm wheel, a pair of independent clutches for connecting the worm wheel to the prime mover, a yoke for engaging each clutch independently, a piston for operating both yokes simultaneously and automatic means responsive to the speed of the prime mover for operating both yokes, the worms and worm wheel being of reversible pitch to permit one clutch to drive both worms when there is a time lag between the starting of the two worms by the two clutches.

5. The combination of a variable pitch propeller, a prime mover for rotating the propeller, a member for changing the pitch of the propeller blades while the propeller is being rotated by the prime mover, a non-reversible force transmitting actuator for said member, a worm wheel for moving the actuator, a pair of worms for driving the worm wheel, two independent pairs of clutches, one pair being associated with each worm for selectively connecting that worm to the prime mover for rotation in opposite directions, and a single means for selectively operating one clutch of each pair simultaneously, the worms and worm wheel being of reversible pitch to permit one clutch to drive both worms when there is a time lag between the starting of the two worms by the two clutches.

6. The combination of a variable pitch propeller, a prime mover for rotating the propeller, a member for changing the pitch of the propeller blades while the propeller is being rotated by the prime mover, a non-reversible force-transmitting actuator for said member, a worm wheel for moving the actuator, a worm for driving the worm wheel, a pair of clutches for selectively connecting the worm to the prime mover for rotation in opposite directions, a second worm wheel for driving the worm, a second worm for driving the second worm wheel, a second prime mover for driving the second worm and means responsive to stopping and starting of the second prime mover for connecting it to the second worm and disconnecting it from the second worm, the second worm wheel and the second worm being of reversible pitch to permit the clutch to drive the second worm through the second worm wheel.

7. The combination of a variable pitch propeller, a prime mover for rotating the propeller, a member for changing the pitch of the propeller blades while the propeller is being rotated by the prime mover, a non-reversible force-transmitting actuator for said member, a worm wheel for moving the actuator, a pair of worms for driving the worm wheel, two independent clutches connected one to each worm and both to the prime mover, single means for operating both clutches, a second worm wheel for driving one of the pair of worms, a third worm for driving the second worm wheel, and a second prime mover for driving the third worm, the first worm wheel and its engaging pair of worms being of reversible pitch to permit the second prime mover to drive both of the worms of said pair.

EMIL A. BRINER.